(12) United States Patent
Baek et al.

(10) Patent No.: US 9,778,455 B2
(45) Date of Patent: Oct. 3, 2017

(54) DISPLAY APPARATUS AND METHOD OF DRIVING THE SAME

(71) Applicant: Amazon Technologies, Inc., Seattle, WA (US)

(72) Inventors: Seung-Jin Baek, Suwon-si (KR); Sang-Il Kim, Yongin-si (KR); Yeuntae Kim, Suwon-si (KR); Hyeon Gu Cho, Yongin-si (KR)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 14/665,872

(22) Filed: Mar. 23, 2015

(65) Prior Publication Data

US 2015/0192771 A1    Jul. 9, 2015

Related U.S. Application Data

(63) Continuation of application No. 13/483,805, filed on May 30, 2012, now Pat. No. 8,988,761.

(30) Foreign Application Priority Data

Jul. 19, 2011    (KR) .................. 10-2011-0071455

(51) Int. Cl.
| | | |
|---|---|---|
| *G02F 1/03* | (2006.01) | |
| *G02F 1/07* | (2006.01) | |
| *G02F 1/153* | (2006.01) | |
| *G02B 26/00* | (2006.01) | |
| *G02B 26/02* | (2006.01) | |
| *G02B 5/00* | (2006.01) | |
| *G09G 3/34* | (2006.01) | |

(52) U.S. Cl.
CPC .......... *G02B 26/005* (2013.01); *G02B 5/003* (2013.01); *G02B 26/023* (2013.01); *G09G 3/348* (2013.01)

(58) Field of Classification Search
USPC ........ 359/242, 265–266, 270–273, 315, 322, 359/290–292, 295, 298
See application file for complete search history.

(56) References Cited

U.S. PATENT DOCUMENTS

| | | | |
|---|---|---|---|
| 8,144,117 B2 | 3/2012 | Okada et al. | |
| 8,451,407 B2 | 5/2013 | Jeong et al. | |
| 2008/0297880 A1 | 12/2008 | Steckl et al. | |
| 2009/0103026 A1* | 4/2009 | Yang ................. | G02F 1/133707 349/114 |
| 2009/0103159 A1 | 4/2009 | Cheng et al. | |
| 2010/0284056 A1* | 11/2010 | Giraldo ................ | G02B 26/004 359/292 |
| 2011/0001690 A1 | 1/2011 | Mori et al. | |

OTHER PUBLICATIONS

Final Office Action for U.S. Appl. No. 13/483,805, dated Nov. 20, 2013, Seung-Jin Baek, "Display Apparatus and Method of Driving the Same", 11 pages.
Office Action for U.S. Appl. No. 13/483,805, dated Mar. 21, 2014, Seung-Jin Baek, "Display Apparatus and Method of Driving the Same", 12 pages.

* cited by examiner

*Primary Examiner* — Brandi Thomas
(74) *Attorney, Agent, or Firm* — Lee & Hayes, PLLC

(57) ABSTRACT

A transflective display apparatus includes a first electrode and a second electrode, which face each other and are separated from one another by a pixel electrode. In addition, a preparation voltage is applied to the first electrode or the second electrode before applying a driving voltage to the pixel electrode.

20 Claims, 19 Drawing Sheets

DISPLAY APPARATUS AND METHOD OF DRIVING THE SAME

CROSS-REFERENCE TO RELATED APPLICATION

This application is a continuation of and claims priority to U.S. patent application Ser. No. 13/483,805, filed May 30, 2012, now U.S. Pat. No. 8,988,761, issued Mar. 24, 2015, which claims priority to Korean Patent Application No. 10-2011-0071455, filed Jul. 19, 2011, the contents of which are herein incorporated by reference in their entirety.

BACKGROUND

1. Technical Field

The present disclosure relates to a display apparatus capable of realizing a reflective mode and a transmissive mode.

2. Description of Related Art

An electro-wetting display apparatus has emerged as a next generation display apparatus. The electro-wetting display apparatus has fast response speed, low driving voltage, thin thickness, etc. as compared to other types of display apparatus. The electro-wetting display apparatus displays images using an electro-wetting phenomenon that causes movement or deformation of a fluid by applying a voltage to the fluid in order to change the surface tension of the fluid.

In some of applications, such as e-paper and liquid lenses, droplets of the fluid may be manipulated in-place. More particularly, the movement or deformation may be used to lower a macroscopic contact angle and increase the droplet contact area in order to control light transmission.

SUMMARY

According to an exemplary embodiment of the present disclosure, a display apparatus includes a first substrate including a unit pixel area including a transmission area and a reflection area, a second substrate facing the first substrate, a polar fluid disposed between the first substrate and the second substrate, a non-polar fluid disposed between the first substrate and the second substrate, a pixel electrode disposed on the transmission area and the reflection area, a first electrode disposed on the first substrate adjacent to the transmission area and spaced apart from the pixel electrode, and a second electrode disposed on the first substrate adjacent to the reflection area and facing the first electrode, wherein the pixel electrode is interposed between the first electrode and the second electrode.

The transmission area is spaced apart from the second electrode and the reflection area is according to an exemplary embodiment of the present disclosure, the between the transmission area and the second electrode.

According to an exemplary embodiment of the present disclosure, the display apparatus further includes a pixel wall defining the unit pixel area on the first substrate. The first electrode and the second electrode are disposed between the pixel wall and the first substrate, and the first electrode and the second electrode are partially overlapped with the pixel wall when viewed in a plan view.

According to an exemplary embodiment of the present disclosure, the first electrode and the second electrode are substantially parallel to each other.

According to an exemplary embodiment of the present disclosure, the pixel wall has a polygonal shape, the first electrode comprises a first body portion, a first protruding portion, and a second protruding portion, and the second electrode comprises a second body portion, a third protruding portion, and a fourth protruding portion, wherein the first protruding portion is disposed under a first corner of the pixel wall, the second protruding portion is disposed under a second corner adjacent to the first corner, the third protruding portion is disposed opposite to the first protruding portion, and the fourth protruding portion is disposed opposite to the second protruding portion.

According to an exemplary embodiment of the present disclosure, the first body portion and the second body portion are partially overlapped with the pixel wall, and the first protruding portion, the second protruding portion, the third protruding portion, and the fourth protruding portion protrude into the unit pixel area from the pixel wall in a plan view.

According to an exemplary embodiment of the present disclosure, the display apparatus further includes an adjacent unit pixel area adjacent to the unit pixel area. The pixel wall has a polygonal shape, the first electrode includes a first body portion and a first protruding portion connected to the first body portion, and the second electrode includes a second body portion and a second protruding portion connected to the second body portion, wherein the first and second body portions are substantially parallel to each other and extend to the adjacent unit pixel area, the first protruding portion is disposed at a first corner of the pixel wall, and the second protruding portion is disposed at a second corner opposite to the first corner in a diagonal direction.

According to an exemplary embodiment of the present disclosure, the transmission area is adjacent to the reflection area and the reflection area is wider than the transmission area.

According to an exemplary embodiment of the present disclosure, the display apparatus further includes a reflection electrode defining the reflection area and a transmission electrode disposed over the transmission area and the reflection area.

According to an exemplary embodiment of the present disclosure, the reflection electrode is disposed between the transmission electrode and the first substrate.

According to an exemplary embodiment of the present disclosure, the display apparatus further includes a black matrix disposed on the second substrate, wherein the first and second electrodes positioned in an area between the pixel wall and the pixel electrode are covered by the black matrix when viewed in a plan view.

According to an exemplary embodiment of the present disclosure, the transmission area has an area equal to or smaller than about 20% of an area of the unit pixel area.

According to an exemplary embodiment of the present disclosure, a method of driving a display apparatus includes applying a first preparation voltage to a first electrode and pushing a non-polar fluid toward the first electrode by a polar fluid controlled by the first preparation voltage, and applying a first driving voltage to the pixel electrode to drive the display apparatus in a first mode.

According to an exemplary embodiment of the present disclosure, the first driving voltage has a level to control the polar fluid to push the non-polar fluid to cover the reflection area.

According to an exemplary embodiment of the present disclosure, the method further includes cutting off the first preparation voltage and the first driving voltage, applying a second preparation voltage to the second electrode and pushing the non-polar fluid toward the second electrode by the polar fluid controlled by the second preparation voltage, and applying a second driving voltage to the pixel electrode to drive the display apparatus in a second mode.

According to an exemplary embodiment of the present disclosure, the first preparation voltage and the second preparation voltage have a level to separate the non-polar fluid from a pixel wall.

According to an exemplary embodiment of the present disclosure, the first preparation voltage is larger than the first driving voltage and the second preparation voltage is larger than the second driving voltage.

According to an exemplary embodiment of the present disclosure, display apparatus includes a first substrate including a unit pixel area, a pixel wall disposed on the first substrate to define the unit pixel area, a pixel electrode disposed in the unit pixel area, a first electrode disposed between the pixel wall and the first substrate, a second electrode disposed between the pixel wall and the first substrate; a second substrate facing the first substrate, a polar fluid disposed between the first substrate and the second substrate, and a non-polar fluid disposed between the first substrate and the second substrate.

According to an exemplary embodiment of the present disclosure, the first electrode and the second electrode are substantially parallel to each other and the pixel electrode is disposed between the first electrode and the second electrode.

According to an exemplary embodiment of the present disclosure, the display apparatus includes an adjacent unit pixel area adjacent to the unit pixel area, wherein the pixel wall has a polygonal shape, the first electrode comprises a first body portion and a first protruding portion connected to the first body portion, and the second electrode comprises a second body portion and a second protruding portion connected to the second body portion, wherein the first and second body portions are substantially parallel to each other and extended to the adjacent unit pixel area, and the first protruding portion is disposed at a first corner of the pixel wall, and the second protruding portion is disposed at a second corner opposite to the first corner in a diagonal direction.

According to an exemplary embodiment of the present disclosure, the first electrode and the second electrode are partially overlapped with the pixel wall when viewed in a plan view.

According to an exemplary embodiment of the present disclosure, the first electrode and the second electrode are covered by the pixel wall when viewed in a plan view According to an exemplary embodiment of the present disclosure, the first electrode, the second electrode, and the pixel electrode are individually applied with a voltage.

BRIEF DESCRIPTION OF THE DRAWINGS

Exemplary embodiments of the present disclosure will become readily apparent by reference to the following detailed description when considered in conjunction with the accompanying drawings wherein.

DETAILED DESCRIPTION OF EXEMPLARY EMBODIMENTS

Figure 1:
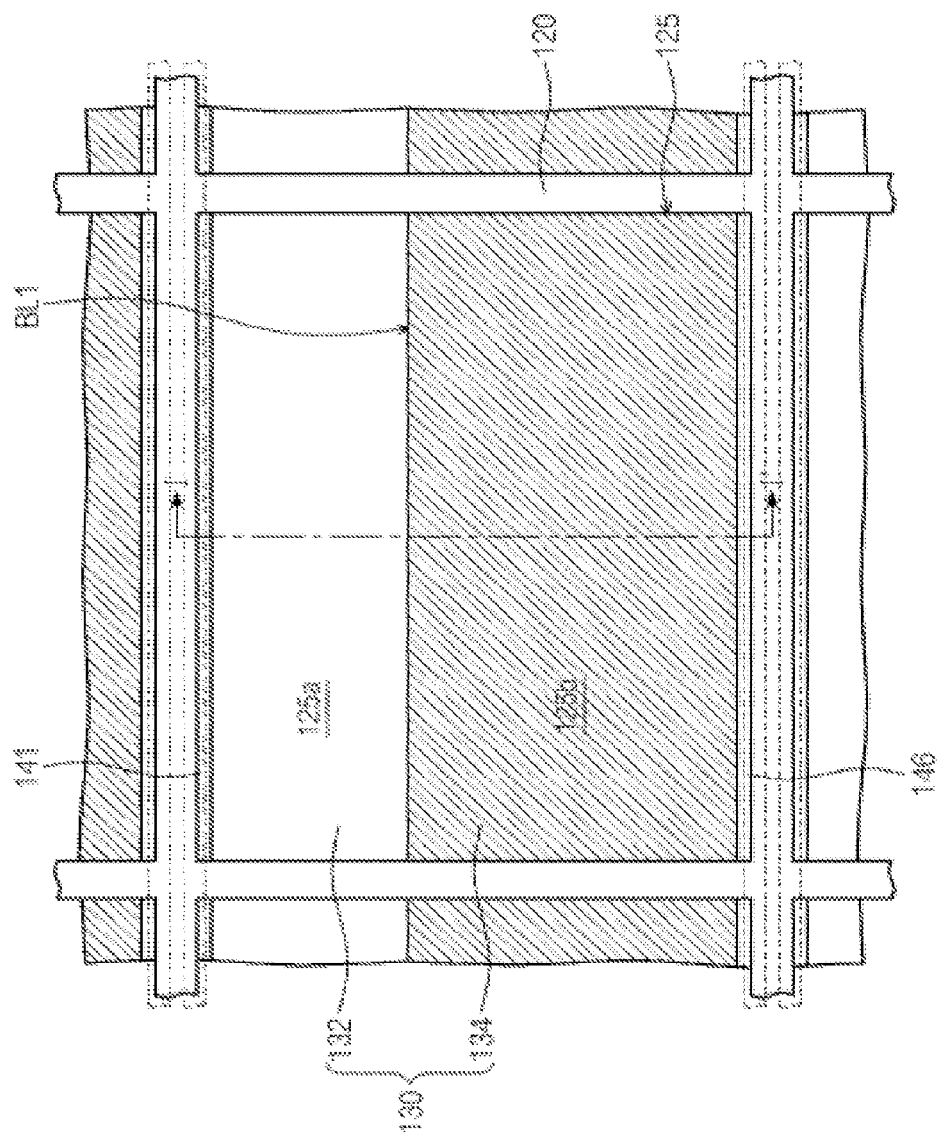
FIG. 1 is a plan view showing a transflective display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be explained in detail with reference to the accompanying drawings.

Figure 2:
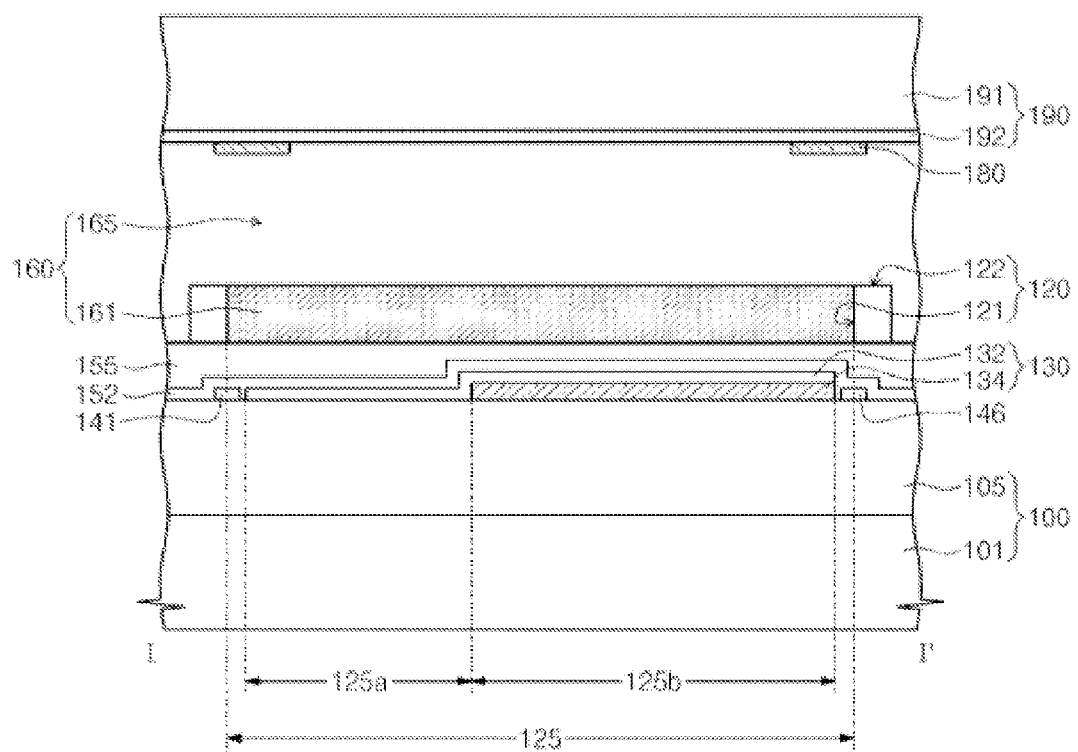
FIG. 2 is a cross-sectional view taken along a line I-I' of FIG. 1.

FIG. 1 is a plan view showing a transflective display apparatus according to an exemplary embodiment of the present disclosure and FIG. 2 is a cross-sectional view taken along a line I-I' of FIG. 1.

Referring to FIGS. 1 and 2, the transflective display apparatus includes a first substrate 100, a second substrate 190 facing the first substrate 100, and a fluid layer 160 interposed between the first substrate 100 and the second substrate 190.

The first substrate 100 includes a first base substrate 101, a thin film transistor (not shown) disposed on the first base substrate 101, and an inter-insulating layer 105 disposed on the first base substrate 101 covering the thin film transistor. The first base substrate 101 is formed of a transparent material, such as a glass substrate, a plastic substrate, etc. The first base substrate 101 may be a flexible substrate. Although not shown in FIGS. 1 and 2, a plurality of thin film transistors provided on an upper portion of first base substrate 101 and the thin film transistors are connected to each other in series to form a switching array for selecting pixels of the transflective display apparatus. The inter-insulating layer 105 may include an organic material or/and an inorganic material to transmit light. The organic material may be a light-curing material. The inter-insulating layer 105 may have a thickness sufficient to planarize irregularities caused by the thin film transistor disposed on the upper portion of first base substrate 101. The inter-insulating layer 105 may substantially prevent a parasitic capacitance from being generated between a gate electrode of the thin film transistor and a pixel electrode 130.

A pixel wall 120 is disposed on the first substrate 100. The pixel wall 120 defines a unit pixel area 125. The pixel wall 120 may include an organic material such as a light-curing material. The pixel wall 120 includes a side surface 121 corresponding to an edge of the unit pixel area 125 and an upper surface 122 facing the second substrate 190. The upper surface 122 may be hydrophilically treated. The pixel wall 120 includes four walls forming the side surface 121. Among the four walls, two walls face each other and are substantially parallel to each other, and the other two walls face each other and are substantially parallel to each other.

The walls are disposed on the first substrate 100 to provide the pixel wall 120. The unit pixel area 125 may be provided in a plural number, such that a plurality of pixel walls 120 are disposed in a net shape.

The unit pixel area 125 of the first substrate 100 may include a transmission area 125a and a reflection area 125b. According to an embodiment of the present disclosure, the transmission area 125a has an area smaller than that of the reflection area 125b, and in some embodiments the transmission area 125a has an area equal to or smaller than about 20% of an area of the unit pixel area. Although not shown in FIGS. 1 and 2, a light source may be provided outside the display apparatus to supply light to the display apparatus. For example, the light source may be disposed under the first substrate 100, e.g., a direct-illumination type display apparatus. In this case, the light source may be disposed to face the second substrate 190 with the first substrate 100 interposing therebetween. According to another example, the light source may be disposed adjacent to one or more side surfaces of the first substrate 100, e.g., an edge-illumination type display apparatus.

Various types of light sources may be implemented, including a point light source, a line light source, or a surface light source, and the like. The present disclosure should not be limited thereto or thereby. For example, the point light source, such as a light emitting diode, may be used as the light source according to an exemplary embodiment, or the line light source, such as a cold cathode fluorescent lamp, an external electrode fluorescent lamp, etc., may be used as the light source according to another exemplary embodiment.

The light provided to the transmission area 125a from the light source may travel through the transmission area 125a to an exterior of the display apparatus. The light provided to the reflection area 125b from the exterior of the display apparatus is reflected from the reflection area 125b to the exterior of the display apparatus. The reflection area 125b may be wider than the transmission area 125a. The reflection area 125b displays an image by reflecting the light provided from its surround area. A first boundary line BL1 between the transmission area 125a and the reflection line 125b may be substantially parallel to a pair of the pixel walls 120.

The pixel electrode 130 may be disposed in the unit pixel area 125. When viewed in a plan view, the pixel electrode 130 may have substantially the same outline as the profile of side surface 121 of the pixel walls 120. An end portion of the pixel electrode 130 may be overlapped with the pixel wall 120. In this case, the end portion substantially parallel to the first boundary line BL1 is spaced apart from the pixel wall 120 in a plan view. The pixel electrode 130 may include a transmission electrode 132 and a reflection electrode 134. The reflection electrode 134 is disposed in the reflection area 125b and the transmission electrode 132 is disposed over the reflection area 125b and the transmission area 125a. Thus, the reflection electrode 134 may be disposed between the transmission electrode 132 and the first substrate 100. The transmission area 125a and the reflection area 125b make contact with each other and the position of the first boundary line BL1 between the transmission area 125a and the reflection area 125b is determined by an extent of the reflection electrode 134.

A first electrode 141 and a second electrode 146 are disposed on the first substrate 100 to be substantially parallel to each other. The pixel electrode 130 is disposed between the first electrode 141 and the second electrode 146. The first electrode 141 may be adjacent to the transmission area 125a and spaced apart from the pixel electrode 130. The second electrode 146 is adjacent to the reflection area 125b and spaced apart from the pixel electrode 130 and the first electrode 141. The transmission area 125a is interposed between the reflection area 125b and the first electrode 141. Similar to this, the transmission area 125a is spaced apart from the second electrode 146 with the reflection area 125b interposed therebetween. The first electrode 141 and the second electrode 146 have a line shape and are extended in an adjacent unit pixel area to face each other. The first electrode 141 and the second electrode 146 may be substantially parallel to the first boundary line BL1 and may be disposed between the first substrate 100 and the pixel wall 120. In this case, the first electrode 141 and the second electrode 146 may be disposed closer to the pixel electrode 130 than the pixel wall 120. In other words, a portion of each of the first and second electrodes 141 and 146 is overlapped with the pixel wall 120. As described above, the pixel electrode 130, the first electrode 141, and the second electrode 146 are separated from each other and individually applied with a voltage.

An insulating layer 155 is disposed between the pixel wall 120 and the first substrate 100 to cover the pixel electrode 130, the first electrode 141, and the second electrode 146. The insulating layer 155 has a flat upper surface. A portion of the upper surface of the insulating layer 155, adjacent to the pixel wall 120, may be hydrophobic. For example, the insulating layer 155 may include a hydrophobic material such as Teflon.

A barrier layer 152 may be further disposed between the insulating layer 155 and the first substrate 100 to cover the pixel electrode 130, the first electrode 141, and the second electrode 146. The barrier layer 152 may protect the structure disposed thereunder. To this end, the barrier layer 152 may include an inorganic material such as silicon oxide.

The fluid layer 160 includes a polar fluid 165 and a non-polar fluid 161. The non-polar fluid 161 and the polar fluid 165 are not mixed with each other and are disposed between the insulating layer 155 and the second substrate 190. For example, the non-polar fluid 161 may be an oil-based material and the polar fluid 165 may be an electrolyte solution, such as water. The polar fluid 165 may be disposed over a plurality of unit pixel areas. The non-polar fluid 161 may be individually disposed in the unit pixel areas. The non-polar fluid 161 is opaque and may have a color caused by pigment or dye. The polar fluid 165 is transparent.

The second substrate 190 may include a second base substrate 191 and a common electrode 192 disposed on the second base substrate 191. The common electrode 192 is disposed on a surface of the second base substrate 191 that faces the first substrate 100. The second base substrate 191 is transparent or/and flexible and may be a glass substrate or a plastic substrate. The common electrode 192 may be a transparent electrode. A black matrix 180 may be disposed on the common electrode 192. The black matrix 180 is disposed corresponding to areas between the pixel wall 120 and the pixel electrode 130. In more detail, the black matrix 180 is disposed corresponding to the portion of each of the first and second electrodes 141 and 146 disposed between the pixel wall 120 and the pixel electrode 130. The black matrix 180 is not transparent.

Figure 3:
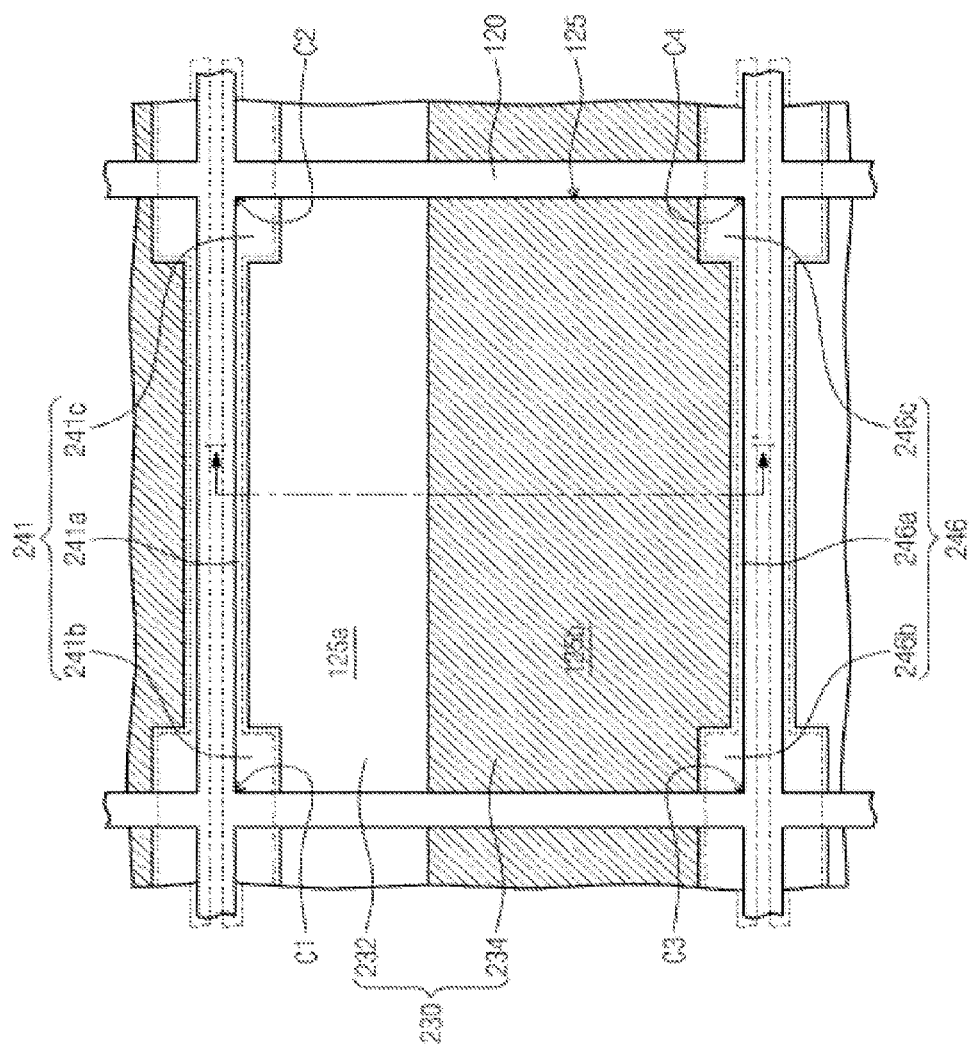
FIG. 3 is a plan view showing a transflective display apparatus according to another exemplary embodiment of the present disclosure.

Although not shown in FIGS. 1 and 3, a sealant may be disposed between the first substrate 100 and the second substrate 190 to couple the first substrate 100 and the second substrate 190.

FIG. 3 is a plan view showing a transflective display apparatus according to another exemplary embodiment of the present disclosure. In FIG. 3, the same reference numerals denote the same elements in FIGS. 1 and 2, and thus detailed descriptions thereof will be omitted.

Referring to FIG. 3, a first electrode 241 and a second electrode 246 respectively include a first body portion 241a and a second body portion 246a, which are substantially parallel to each other and formed in a linear shape. The first body portion 241a and the second body portion 246a may be disposed under the pixel wall 120 to overlap with the pixel wall 120.

When viewed in a plan view, the pixel wall 120 has a polygonal shape. In addition, the first electrode 241 includes a first protruding portion 241b and a second protruding portion 241c, which protrude from the first body portion 241a toward the second body portion 246a. The first protruding portion 241b and the second protruding portion 241c are disposed adjacent to corners of the pixel wall 120 or the unit pixel area 125. In detail, the first protruding portion 241b is positioned at a first corner C1 of the unit pixel area 125 defined by the pixel wall 120, and the second protruding portion 241c is positioned at a second corner C2 adjacent to the first corner C1. The first protruding portion 241b and the second protruding portion 241c protrude from the first body portion 241a. The first protruding portion 241b and the second protruding portion 241c do not extend along the pixel wall 120.

Similarly, the second electrode 246 includes a third protruding portion 246b and a fourth protruding portion 246c, which protrude from the second body portion 246a toward the first body portion 241a. The third protruding portion 246b is positioned at a third corner C3 adjacent to the first corner C1 and the fourth protruding portion 246c is positioned at a fourth corner C4 adjacent to the second corner C2. The second electrode 246 may be symmetrical with the first electrode 241.

In a plan view, the pixel electrode 230 has an outer outline corresponding to an inner outline formed by the pixel wall 120 and the first and second electrodes 241 and 246. In other words, the pixel electrode 230 includes a pair of sides substantially parallel to the pixel wall 120 extending between the first and second electrodes 241 and 246, and a pair of sides substantially parallel to the first and second electrodes 241 and 246. The pixel electrode 230 has the outline bent inward at the first, second, third, and fourth corners C1, C2, C3, and C4, respectively, to corresponding to the protruding portions 241b, 241c, 246b, and 246c. Thus, the transmission electrode 232 and the reflection electrode 234 of the pixel electrode 230 may have the same outline as the protruding portions 241b, 241c, 246b, and 246c at positions adjacent to the protruding portions 241b, 241c, 246b, and 246c.

Figure 4:
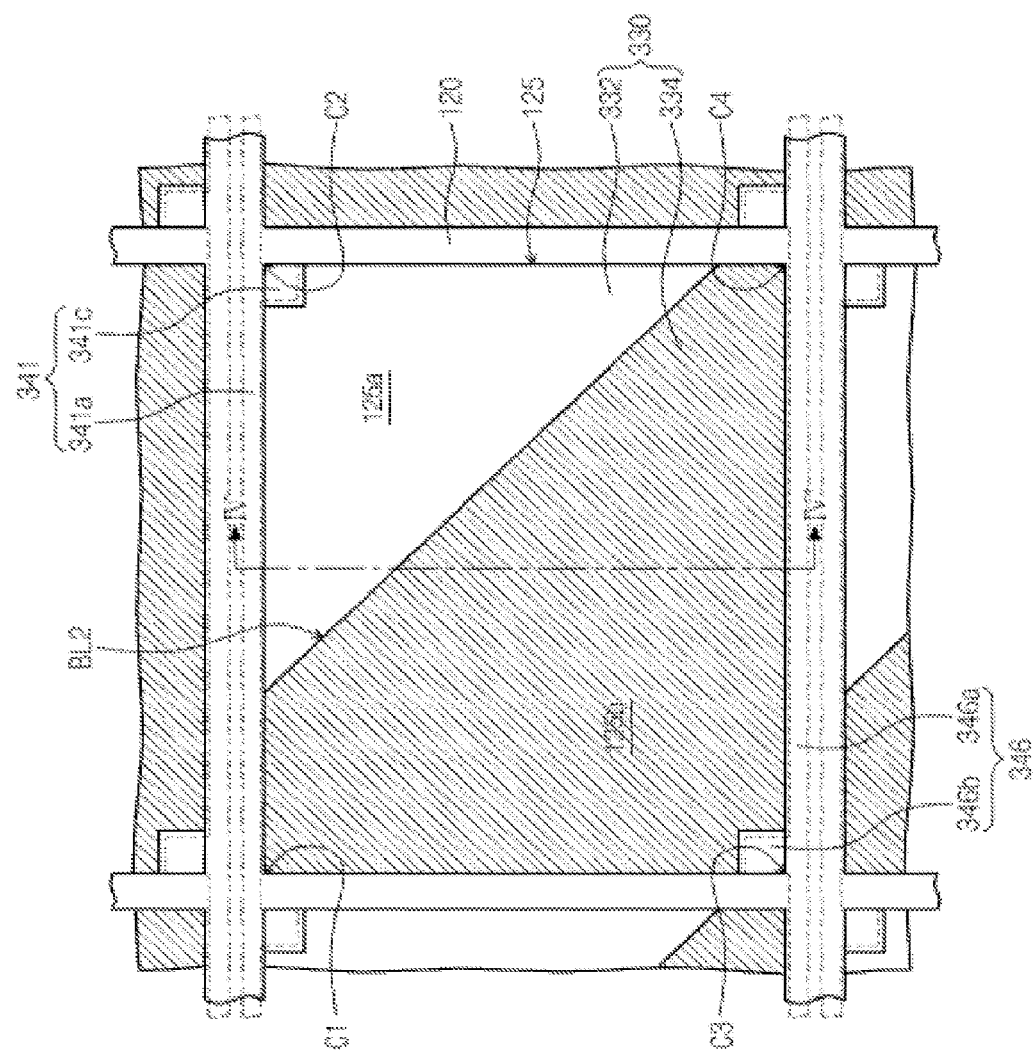
FIG. 4 is a plan view showing a transflective display apparatus according to another exemplary embodiment of the present disclosure.

FIG. 4 is a plan view showing a transflective display apparatus according to another exemplary embodiment of the present disclosure. In FIG. 4, the same reference numerals denote the same elements in FIGS. 1 and 2, and thus detailed descriptions thereof will be omitted.

Referring to FIG. 4, a first electrode 341 includes a first body portion 341a and a first protruding portion 341c, which are connected with each other. A second electrode 346 opposite to the first electrode 341 includes a second body portion 346a and a second protruding portion 346b, which are connected with each other. The first body portion 341a and the second body portion 346a are each formed having a linear shape and are substantially parallel to each other. The first body portion 341a and the second body portion 346a may be disposed under the pixel wall 120, and thus the first body portion 341a and the second body portion 346a may be covered by the pixel wall 120 when viewed in a plan view.

The unit pixel area 125 having a rectangular shape defined by the pixel wall 120 includes a first corner C1 and a second corner C2 adjacent to the first corner C1. In addition, the unit pixel area 125 further includes a fourth corner C4 opposite to the first corner C1 in the diagonal direction and a third corner C3 opposite to the second corner C2 in the diagonal direction.

The first protruding portion 341c is disposed at the second corner C2 and the second protruding portion 346b is disposed at the third corner C3. That is, the first protruding portion 341c and the second protruding portion 346b are aligned in the diagonal direction in the unit pixel area 125. The first protruding portion 341c and the second protruding portion 346b protrude from the first body portion 341a and the second body portion 346a, respectively. The first protruding portion 341c and the second protruding portion 346b do not extend along the pixel wall 120.

In a plan view, a pixel electrode 330 has an outer outline corresponding to an inner outline formed by the pixel wall 120 and the first and second electrodes 341 and 346. In other words, the pixel electrode 330 includes a pair of sides substantially parallel to the pixel wall 120 extending between the first and second electrodes 341 and 346 and a pair of sides substantially parallel to the first and second electrodes 341 and 346. The pixel electrode 330 has the outline bent inward at the second and third corners C2 and C3 to corresponding to the protruding portions 341c and 346b. Thus, the pixel electrode 330 including a transmission electrode 332 and a reflection electrode 334 may have the same outline as the protruding portions 341c and 346b at positions adjacent to the protruding portions 341c and 346b.

The reflection area 125b in which the reflection electrode 334 is arranged has a second boundary line BL2 between the reflection area 125b and the transmission area 125a. The second boundary line BL2 may be elongated in a diagonal direction of the unit pixel area 125. In this case, the second boundary line BL2 may be closer to the second corner C2 than to the third corner C3 or a diagonal line connecting the first corner C1 and the fourth corner C4.

Figure 5:
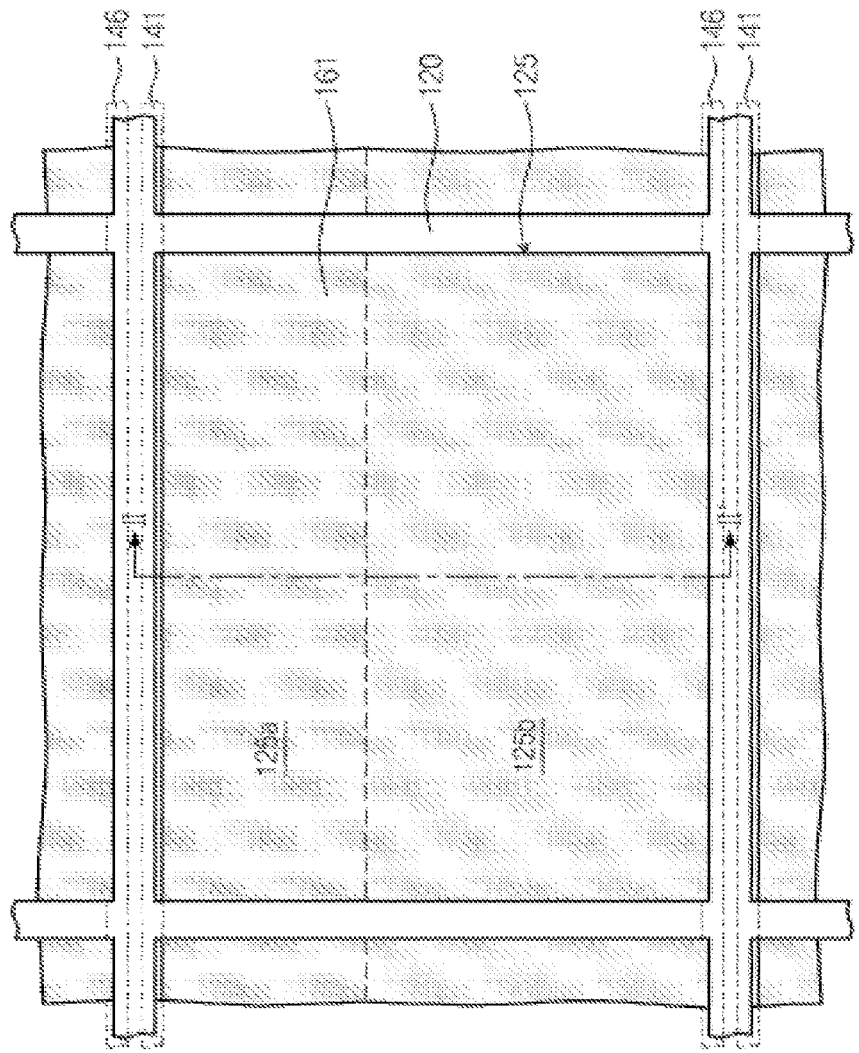
FIGS. 5 and 6 are plan views explaining a method of driving a transflective display apparatus in a first mode according to an exemplary embodiment of the present disclosure.
Figure 6:
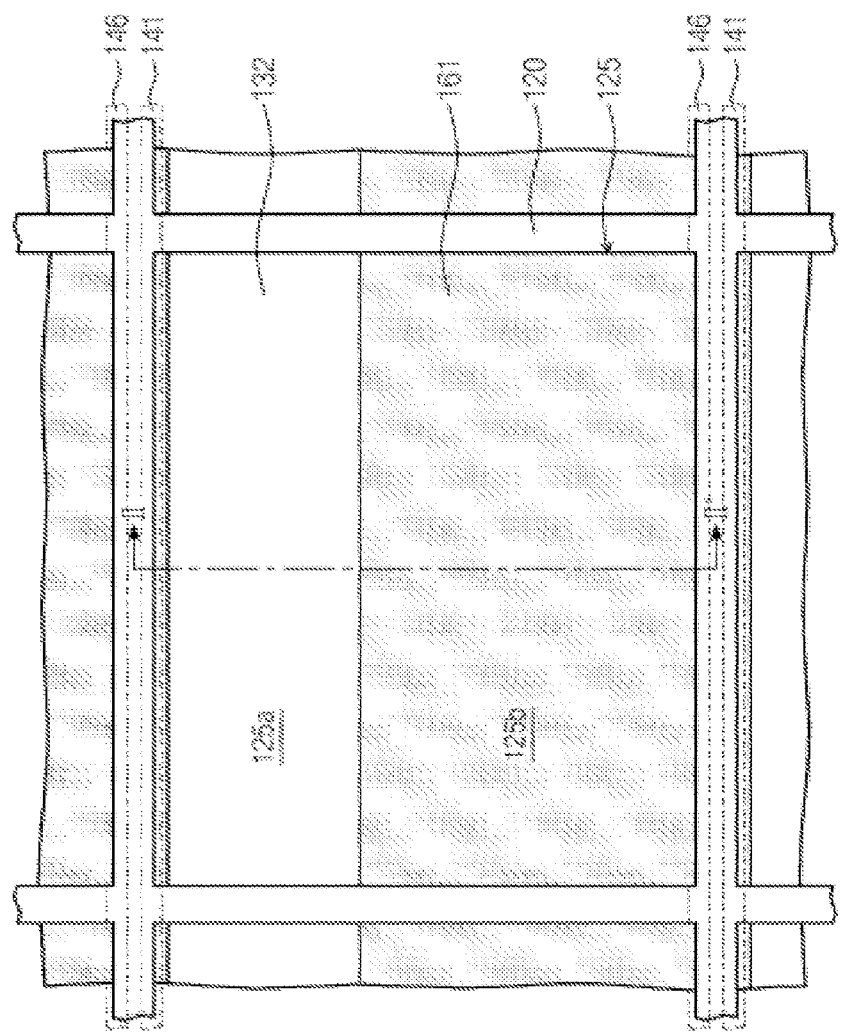
Figure 7:
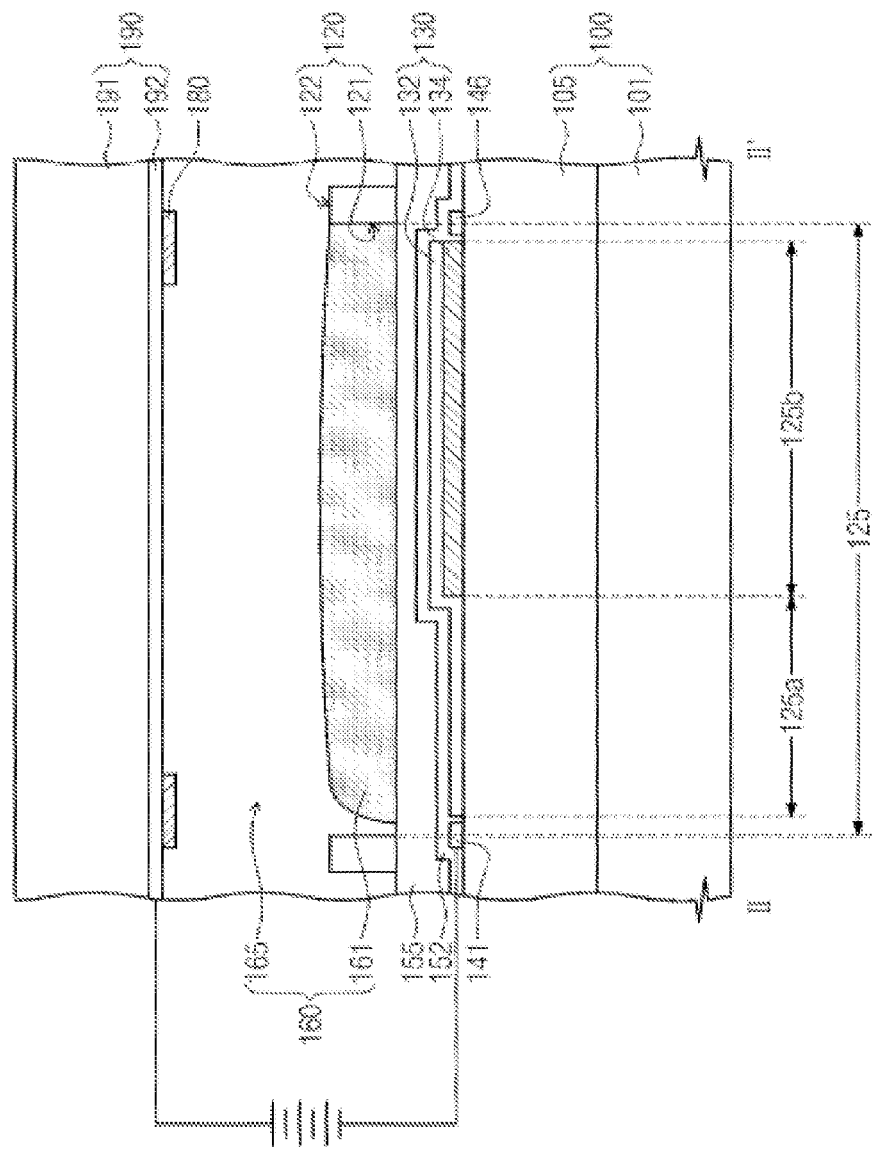
FIGS. 7 and 8 are cross-sectional views respectively taken along lines II-II' of FIGS. 5 and 6.
Figure 8:
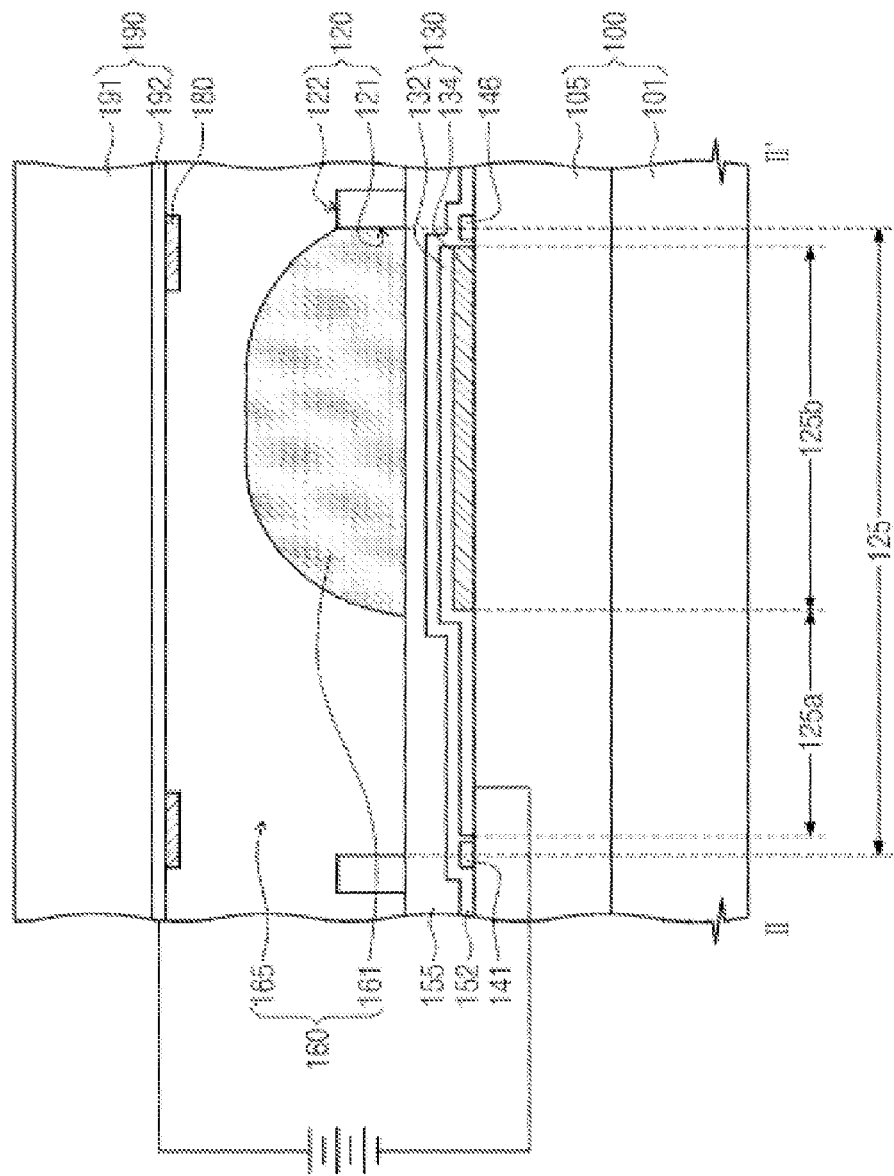
Figure 9:
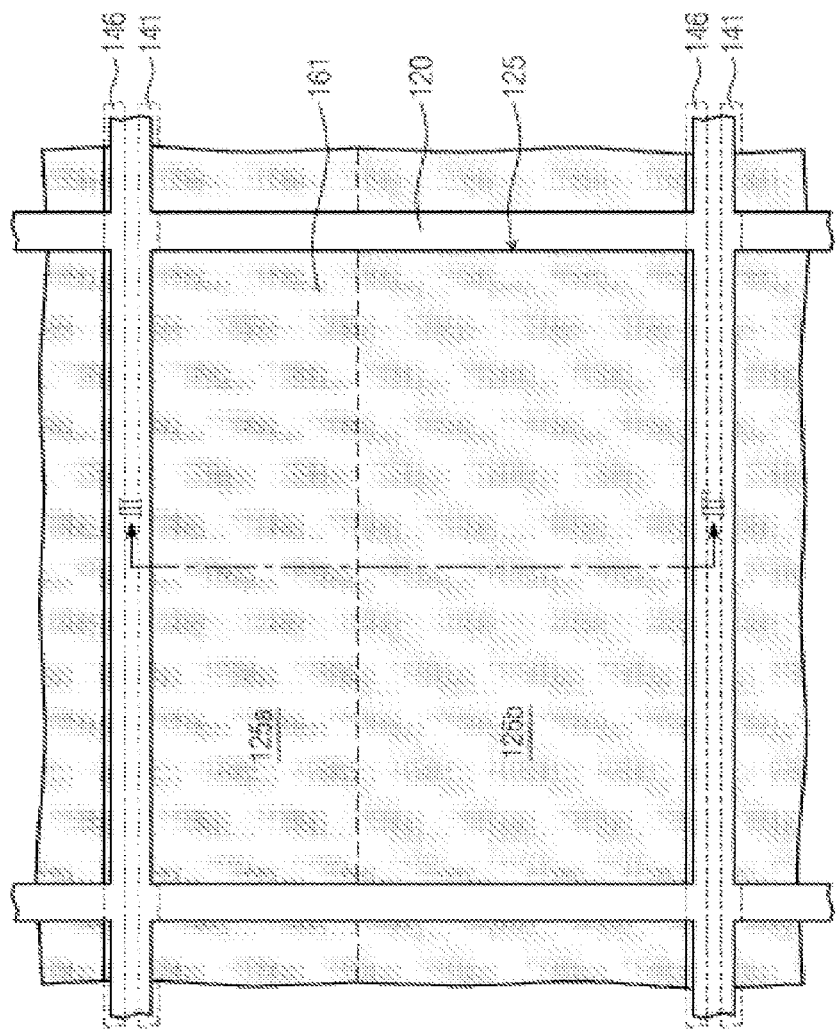
FIGS. 9 and 10 are plan views explaining a method of driving a transflective display apparatus in a second mode according to an exemplary embodiment of the present disclosure.
Figure 10:
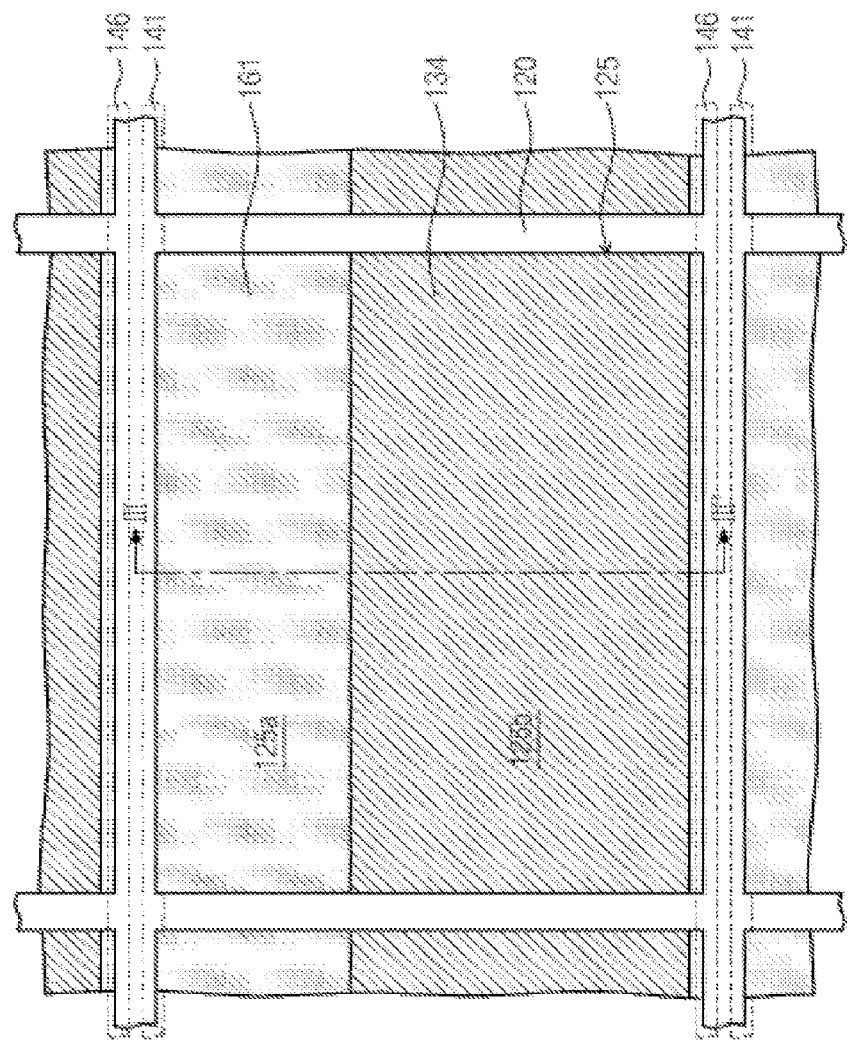
Figure 11:
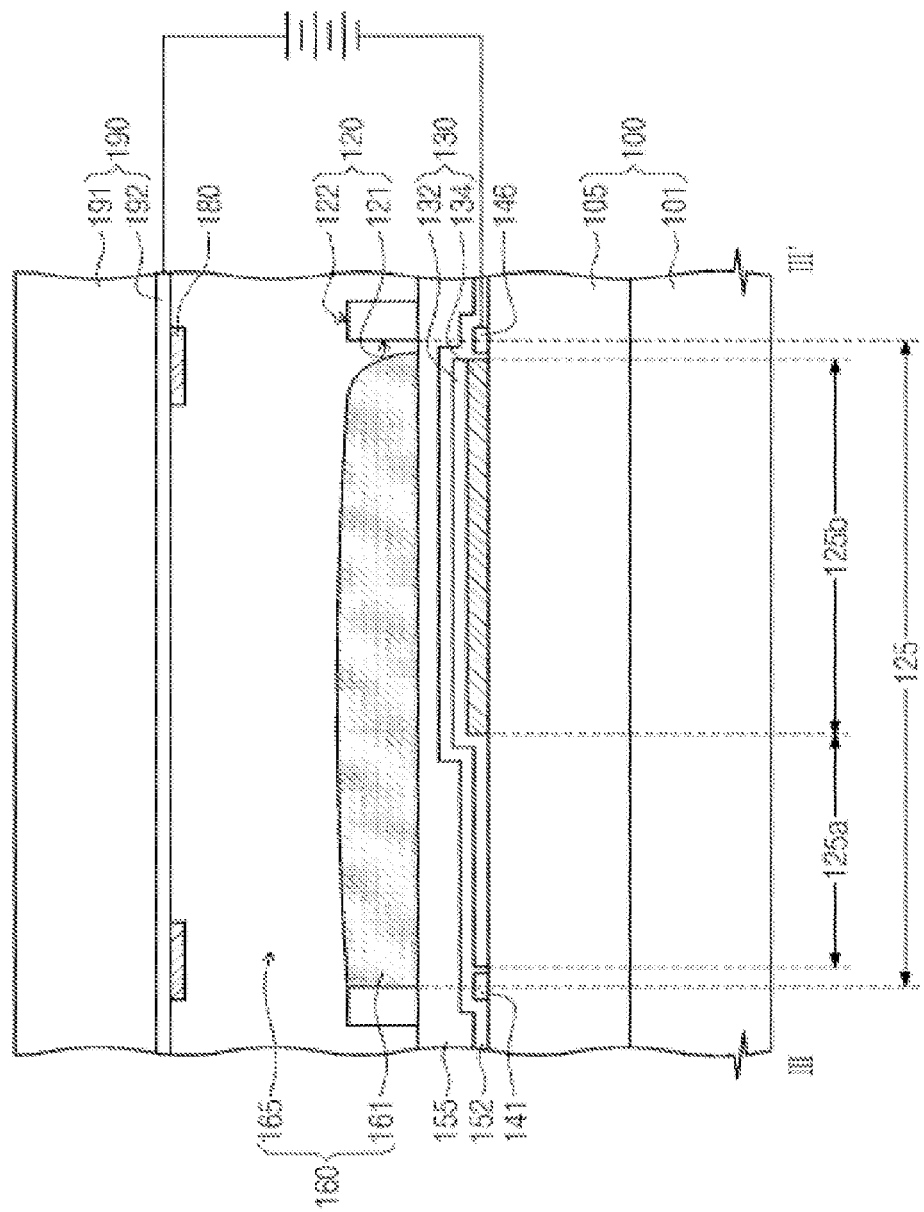
FIGS. 11 and 12 are cross-sectional views respectively taken along lines III-III' of FIGS. 9 and 10.
Figure 12:
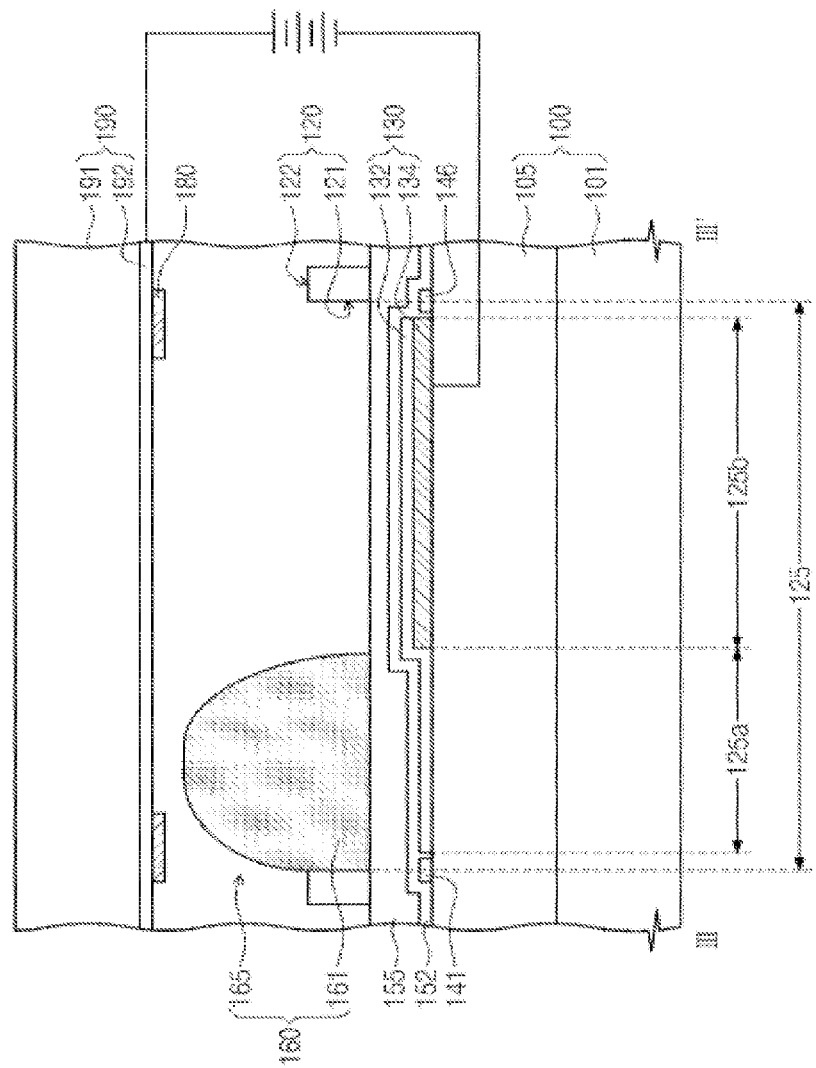

Hereinafter, a method of driving the transflective display apparatus will be described with reference to FIGS. 2 and 5 to 12. FIGS. 5 and 9 are plan views showing the transflective display apparatus to which a preparation voltage is applied, and FIGS. 6 and 10 are plan views showing the transflective display apparatus to which a driving voltage is applied. FIG. 7 is a cross-sectional view taken along a line II-IF of FIG. 5, and FIG. 8 is a cross-sectional view taken along a line II-IF of FIG. 6. FIG. 11 is a cross-sectional view taken along a line III-III' of FIG. 9, and FIG. 12 is a cross-sectional view taken along a line III-III' of FIG. 10.

The transflective display apparatus according to exemplary embodiments may be driven in the transmissive mode or the reflective mode. When the transmissive mode or the reflective mode is selected, the preparation voltage is applied to either the first electrode 141 or the second electrode 146. A direction in which the non-polar fluid moves is controlled according to whether the first electrode 141 or the second electrode 142 receives the preparation voltage.

Referring to FIG. 2, the non-polar fluid 161 forms a continuous layer between the polar fluid 165 and the insulating layer 155 under an equilibrium state. When not applying the voltage, the non-polar fluid 161 maintains the equilibrium state as a low energy state. Accordingly, the non-polar fluid 161 is positioned inside the pixel wall 120 while making contact with the side surface 121. In other words, the non-polar fluid 161 fills the unit pixel area 125 defined by the pixel wall 120. Thus, the unit pixel area 125 does not transmit light when viewed in a plan view.

Referring to FIGS. 5 and 7, when a first mode, that is, the transmissive mode is selected, the first preparation voltage is applied to the first electrode 141. The common electrode 192 receives a voltage having a level different from that of the first preparation voltage, and thus a first preparation voltage difference occurs between the common electrode 192 and the first electrode 141. The polar fluid 165 moves toward the first electrode 141 by the first preparation voltage difference, and the non-polar fluid 161 is pushed away from the first electrode 141. Accordingly, the non-polar fluid 161 may be separated from at least a portion of the side surface 121. That is, the non-polar fluid 161 may have a relatively thin thickness adjacent to the first electrode 141. The first preparation voltage is above a threshold voltage. According to an exemplary embodiment, the threshold voltage indicates the voltage for separating the non-polar fluid 161 from the side surface 121, whereby the non-polar fluid 161 is completely separated from the side surface 121. In other words, the polar fluid 165 may make contact with the insulating layer 155 adjacent to the first electrode 141. The light provided from the light source passing through an opening between the non-polar fluid 161 and the side surface 121 may be prevented from being scattered to the exterior by the black matrix 180.

Referring to FIGS. 6 and 8, a first driving voltage is applied to the pixel electrode 130. The first driving voltage has a level different from that of the voltage applied to the common electrode 192, so that a first driving voltage difference occurs between the common electrode 192 and the pixel electrode 130. The first driving voltage may have a level lower than that of the first preparation voltage. The polar fluid 165 continues to move toward the pixel electrode 130 by the first driving voltage difference and the non-polar fluid 161 is pushed out on the pixel electrode 130. In this case, since the non-polar fluid 161 is spaced apart from the pixel wall 120 adjacent to the first electrode 141 by the first preparation voltage difference, the non-polar fluid 161 moves toward the second electrode 146 opposite to the first electrode 141. The first driving voltage may be controlled such that the non-polar fluid 161 exposes the transmission area 125a without exposing the reflection area 125b. That is, an entire area of the reflection area 125b may be covered by the non-polar fluid 161.

Consequently, the transmission area 125a is exposed and the light provided from the light source transmits through the transmission area 125a to the exterior of the display apparatus.

Referring to FIG. 2 again, the first preparation voltage and the first driving voltage may be cut off, and thus the non-polar fluid 161 may be returned to the equilibrium state.

In the movement of the non-polar fluid 161, the hysteresis effect may be reduced or prevented. Since the non-polar fluid 161 is spaced apart from the pixel wall 120 by the first preparation voltage, the movement of the non-polar fluid 161 by the application of the first driving voltage may be similar to the movement of the non-polar fluid 161 when the first driving voltage is cut off. That is, the path of the movement of the non-polar fluid 161 when applying the first driving voltage is substantially same as the path of the movement of the non-polar fluid 161 when cutting off the first driving voltage.

Referring to FIGS. 9 and 11, when a second mode, that is, the reflective mode is selected, a second preparation voltage is applied to the second electrode 146. The common electrode 192 receives a voltage having a level different from that of the second preparation voltage, so that a second preparation voltage difference occurs between the common voltage 192 and the second electrode 146. As described in the first mode, the non-polar fluid 161 has a relatively thin thickness adjacent to the second electrode 146. In addition, the non-polar fluid 161 is pushed away from the second electrode 146 and the polar fluid 165 makes contact with the insulating layer 155. According to an embodiment of the present disclosure the second preparation voltage may equal the threshold voltage.

Referring to FIGS. 10 and 12, a second driving voltage is applied to the pixel electrode 130. Since the second driving voltage has a level different from that of the voltage applied to the common electrode 192, a second driving voltage difference occurs between the common electrode 192 and the pixel electrode 130. The second driving voltage may have a level lower than that of the second preparation voltage. As described in the first mode, the direction of the movement of the non-polar fluid 161 is determined by the second preparation voltage, and the non-polar fluid 161 moves toward the first electrode 141 opposite to the second electrode 146. The second driving voltage may be controlled such that the non-polar fluid 161 exposes the reflection area 125b without exposing the transmission area 125a.

Consequently, the reflection area 125b is exposed and the light provided from the surround area is reflected by the reflection electrode 134 to the exterior of the display apparatus.

Referring to FIG. 2 again, the second preparation voltage and the second driving voltage may be cut off, so that the non-polar fluid 161 may be returned to the equilibrium state.

Figure 13:
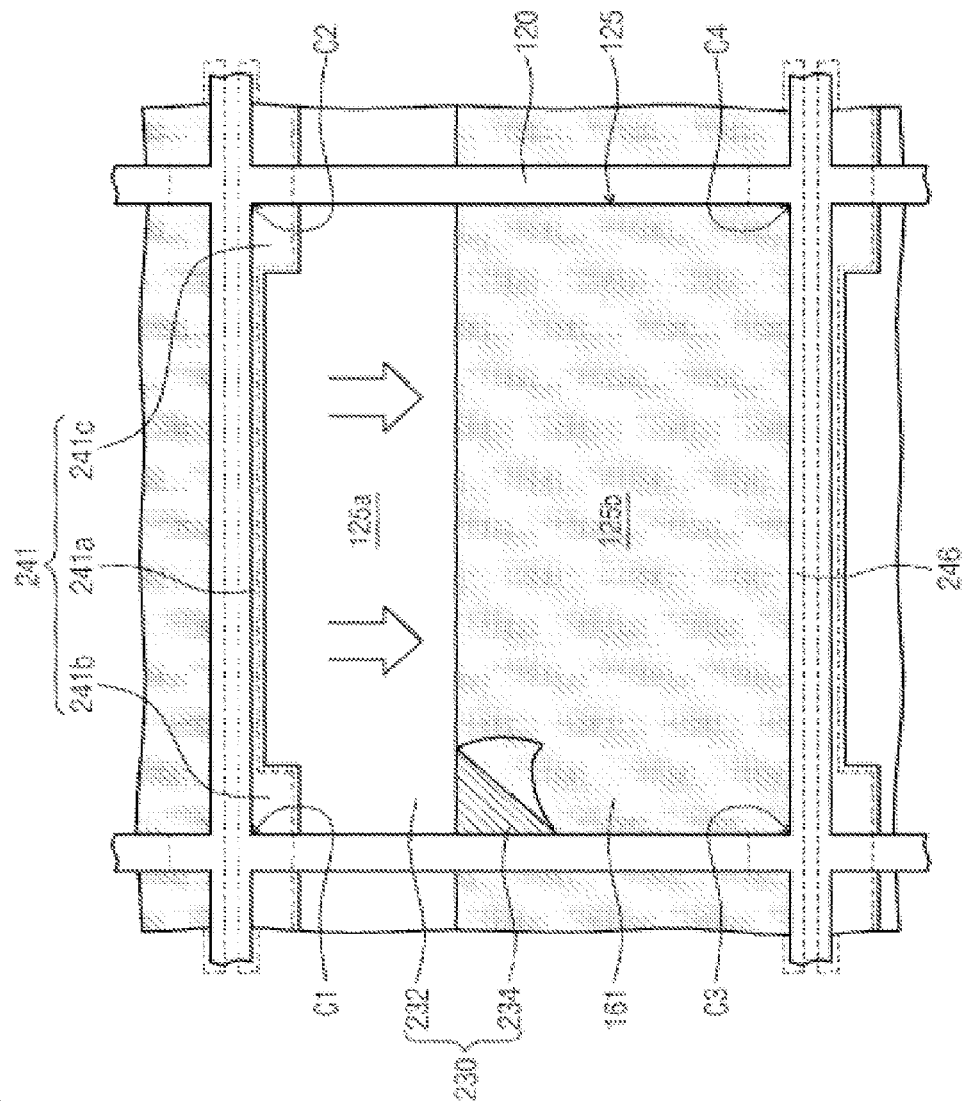
FIGS. 13 and 14 are plan views explaining a method of driving a transflective display apparatus according to another exemplary embodiment of the present disclosure.
Figure 14:
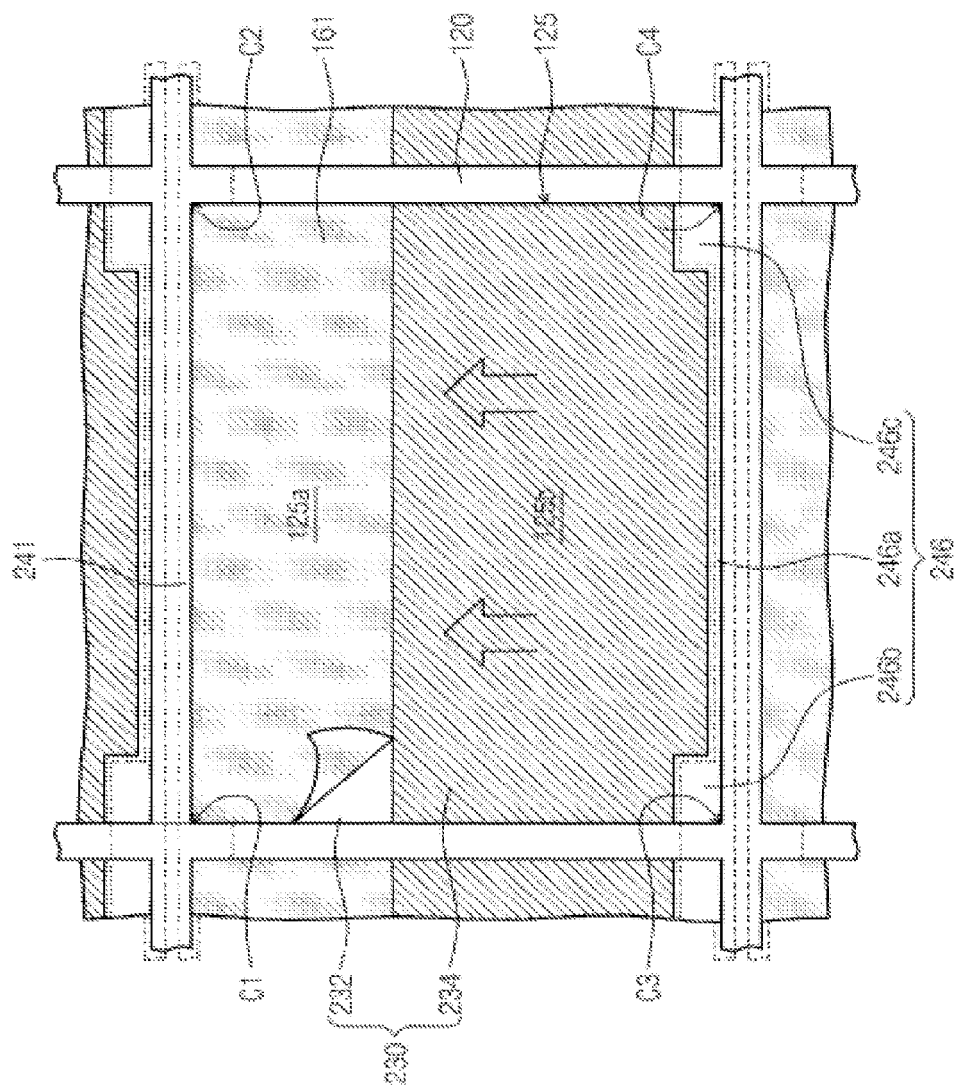

FIGS. 13 and 14 are plan views explaining a method of driving a transflective display apparatus according to another exemplary embodiment of the present disclosure. In FIGS. 13 and 14, the same reference numerals denote the same elements in FIGS. 1 and 2, and thus detailed description thereof will be omitted. In addition, for the convenience of explanation, a portion of the non-polar fluid 161 has been shown to be partially lifted to show a reflection electrode 234 in detail.

Referring to FIG. 13, when the first mode, e.g., the transmissive mode, is selected, a first preparation voltage is applied to a first electrode 241. A first preparation voltage difference occurs between a common electrode (not shown) and the first electrode 241. The polar fluid moves toward the first electrode 241 by the first preparation voltage difference and the non-polar fluid 161 is pushed away from the first electrode 241. Thus, the non-polar fluid 161 may be partially or completely spaced apart from the pixel wall 120. When applying the first preparation voltage, an electric field may be concentrated at a corner portion of the first protruding portion 241b and the second protruding portion 241c. Accordingly, the non-polar fluid 161 may be more easily separated from the pixel wall 120 positioned at the corner portion of the unit pixel area 125.

When the first driving voltage is applied to the pixel electrode 230, the first driving voltage difference occurs between the common electrode and the pixel electrode 230. The polar fluid moves toward the pixel electrode 230 by the first driving voltage difference and the non-polar fluid 161 is pushed out in one direction on the pixel electrode 230. Since the non-polar fluid 161 is spaced apart from the pixel wall 120 on the first electrode 241 by the first preparation voltage difference, the non-polar fluid 161 moves toward the second electrode 246 opposite to the first electrode 241. The first driving voltage may be controlled such that the non-polar fluid 161 exposes the transmission electrode 232 on the transmission area 125a without exposing the reflection electrode 234.

The first preparation voltage and the first driving voltage may cut off, and the non-polar fluid 161 may be returned to the equilibrium state.

Referring to FIG. 14, when the second mode, e.g., the reflective mode, is selected, the second preparation voltage is applied to the second electrode 246. The second preparation voltage difference occurs between the common electrode and the second electrode 246. As described in the first mode, the non-polar fluid 161 may have a relatively thin thickness adjacent to the second electrode 246. In addition, the non-polar fluid 161 is pushed away from the second electrode 246 and the polar fluid 165 may make contact with the insulating layer (not shown). According to an exemplary embodiment of the present disclosure, the second preparation voltage may be equal to the threshold voltage.

When the second driving voltage is applied to the pixel electrode 230, the second driving voltage difference occurs between the common electrode and the pixel electrode 130. The direction of the movement of the non-polar fluid 161 is determined by the second preparation voltage and the non-polar fluid 161 moves toward the first electrode 241 opposite to the second electrode 246. The second driving voltage may be controlled such that the non-polar fluid 161 exposes the reflection electrode 234 without exposing the transmission electrode 232 on the transmission area 125a.

Figure 15:
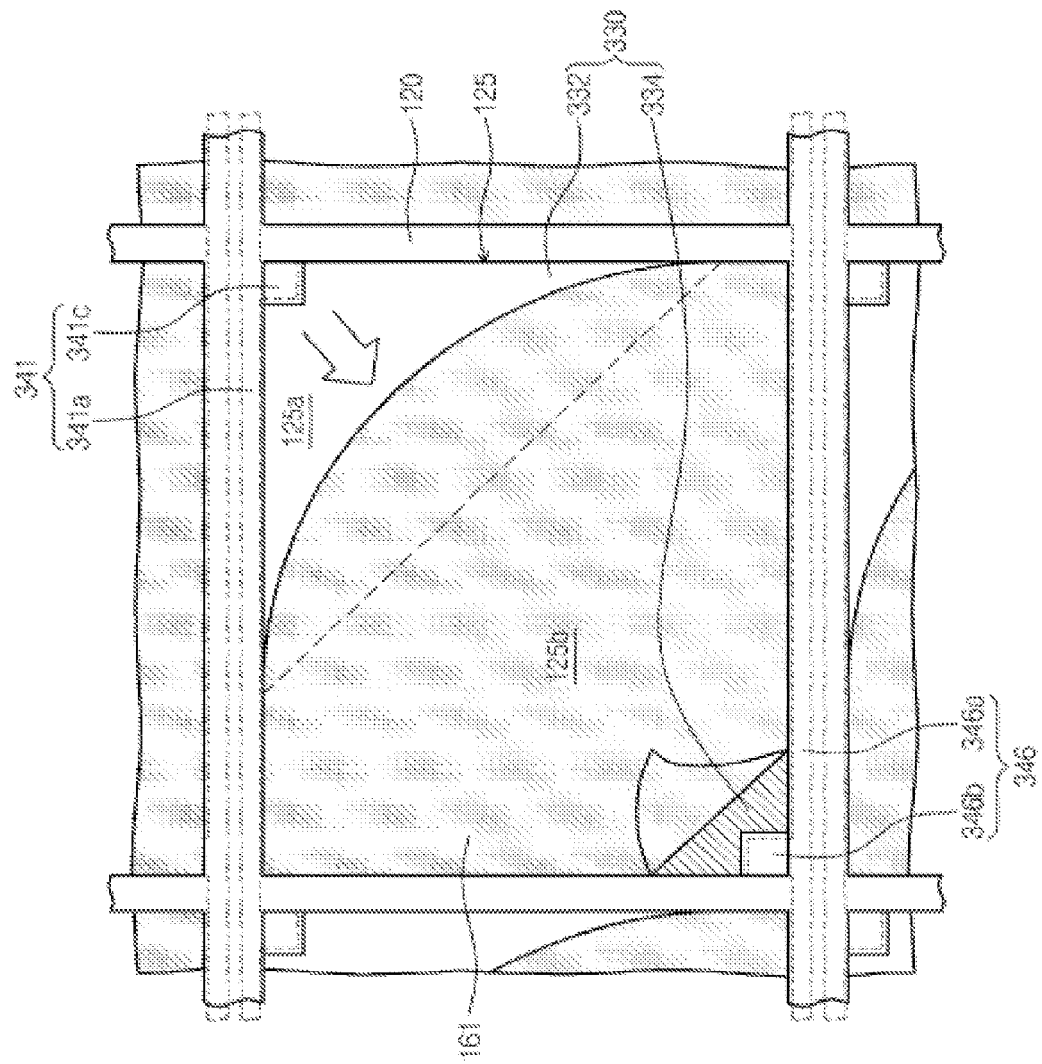
FIGS. 15 and 16 are plan views explaining a method of driving a transflective display apparatus according to another exemplary embodiment of the present disclosure.
Figure 16:
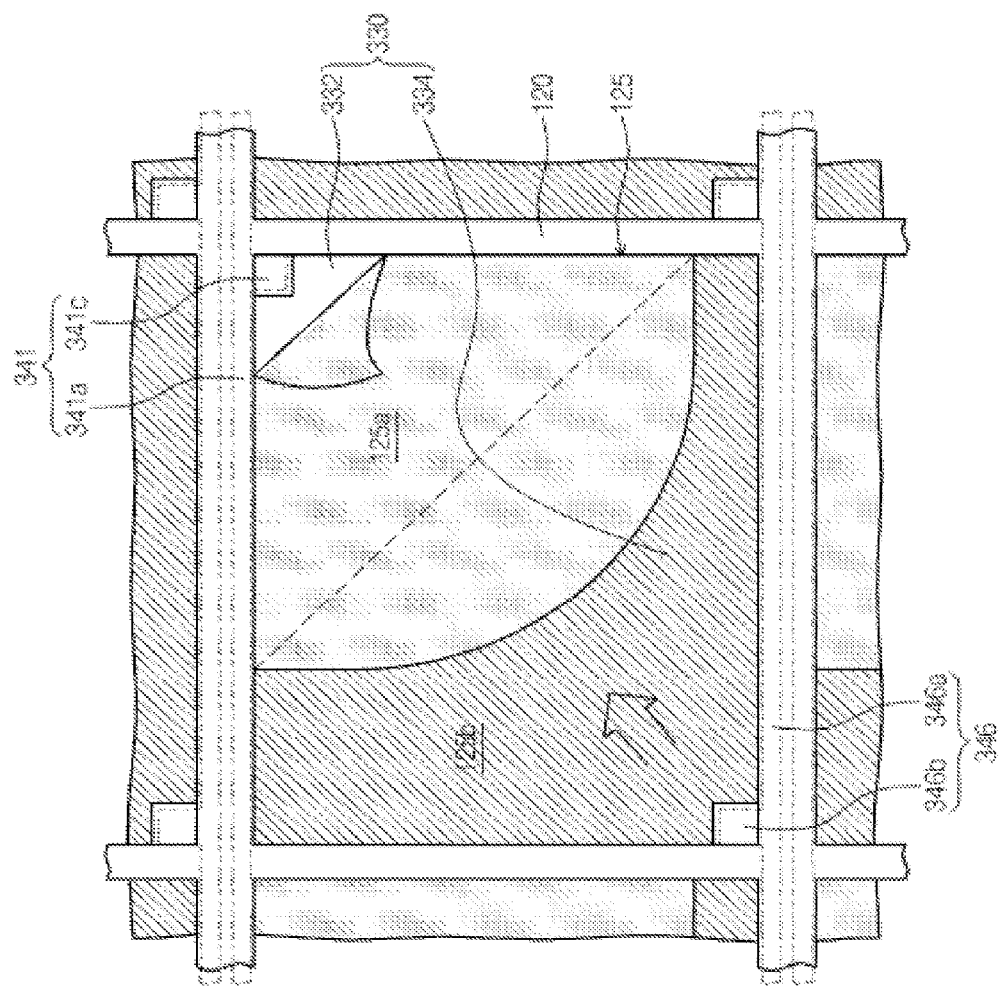

FIGS. 15 and 16 are plan views explaining a method of driving a transflective display apparatus according to another exemplary embodiment of the present disclosure. In FIGS. 15 and 16, the same reference numerals denote the same elements in FIGS. 1 and 2, and thus detailed description thereof will be omitted. In addition, for the convenience of explanation, a portion of the non-polar fluid 161 has been shown to be partially lifted to show a reflection electrode 334 in detail.

Referring to FIG. 15, when the first mode, e.g., the transmissive mode, is selected, the first preparation voltage is applied to the first electrode 341. Since the first body portion 341a of the first electrode 341 is covered by the pixel wall 120, the first preparation voltage difference occurs between the common electrode (not shown) and the first protruding portion 341c. The polar fluid moves toward the first protruding portion 341c by the first preparation voltage difference and the non-polar fluid 161 is pushed away from the first protruding portion 341c. Accordingly, the non-polar fluid 161 may be partially or completely separated from the pixel wall 120 on the first protruding portion 341c. When applying the first preparation voltage, the electric field may be concentrated at the corner portion of the first protruding portion 341c. Thus, the non-polar fluid 161 may be more easily separated from an inner corner of the pixel wall 120.

When the first driving voltage is applied to the pixel electrode 330, the first driving voltage difference occurs between the common electrode and the pixel electrode 330. The polar fluid moves toward the pixel electrode 330 by the first driving voltage difference and the non-polar fluid 161 is pushed out on the pixel electrode 330 in one direction. Since the non-polar fluid 161 is spaced apart from the pixel wall 120 on the first protruding portion 341c by the first preparation voltage difference, the non-polar fluid 161 moves toward the second protruding portion 346b opposite to the first protruding portion 241c. The first driving voltage may be controlled such that the non-polar fluid 161 exposes the transmission electrode 332 on the transmission area 125a without exposing the reflection electrode 334.

The first preparation voltage and the first driving voltage may be cut off, so the non-polar fluid 161 may be returned to the equilibrium state.

Referring to FIG. 16, when the second mode, e.g., the reflective mode, is selected, the second preparation voltage is applied to the second electrode 346. Since the second body portion 346a of the second electrode 346 is covered by the pixel wall 120, the second preparation voltage difference occurs between the common electrode and the second protruding portion 346b. As described in the first mode, the non-polar fluid 161 may have a relatively thin thickness adjacent to the second protruding portion 346b. In addition, the non-polar fluid 161 is pushed away from the second protruding portion 346b and the polar fluid 165 may make contact with the insulating layer (not shown). According to an embodiment of the present disclosure, the second preparation voltage is greater than or equal to the threshold voltage.

When the second driving voltage is applied to the pixel electrode 330, the second driving voltage difference occurs between the common electrode and the pixel electrode 330. The direction of the movement of the non-polar fluid 161 is determined by the second preparation voltage and the non-polar fluid 161 moves toward the first protruding portion 341c opposite to the second protruding portion 346b. The second driving voltage may be controlled such that the non-polar fluid 161 exposes the reflection electrode 234 without exposing the transmission electrode 332 on the transmission area 125a.

Hereinafter, a method of manufacturing the transflective display apparatus will be described with reference to FIGS. 17 to 22. FIGS. 17 to 22 are cross-sectional views showing the manufacturing method of the transflective display apparatus according to an exemplary embodiment of the present disclosure. In detail, FIGS. 17 to 19 and 22 are cross-sectional views taken along the line I-I' of FIG. 1 or 3, and FIG. 20 is a cross-sectional view taken along the line IV-IV' of FIG. 4. In FIGS. 17 to 22, the same reference numerals denote the same elements in FIGS. 1 and 2, and thus detailed descriptions thereof will be omitted.

Figure 17:
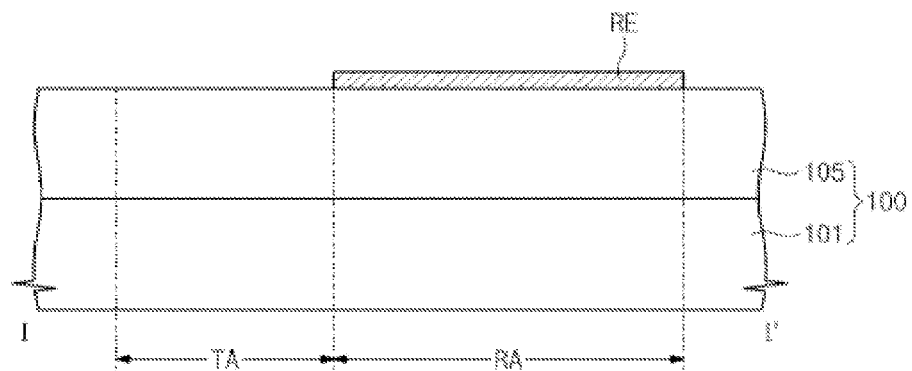
FIGS. 17 to 22 are cross-sectional views showing a method of manufacturing a transflective display apparatus according to exemplary embodiments of the present disclosure.

Referring to FIG. 17, the first substrate 100 is prepared. The first substrate 100 includes the first base substrate 101, the thin film transistor (not shown) formed on the first base substrate 101, and the inter-insulating layer 105 formed on the first base substrate 101 to cover the thin film transistor. The first substrate 100 includes the transmission area TA and the reflection area RA adjacent to the transmission area TA. The shape of the transmission area TA and the reflection area RA may be formed in consideration of the movement direction and the contraction shape of the non-polar fluid.

The first base substrate 101 is a transparent substrate, such as a glass substrate. Although not shown in figures, the thin film transistors are connected to each other in series to form a switching array for selecting pixels. The thin film transistors may be formed by a deposition process and a patterning process. The inter-insulating layer 105 may include the organic material that is a light-curing material. The inter-insulating layer 105 may have a thickness sufficient to planarize irregularities caused by the thin film transistors on the upper portion of the first base substrate 101.

Although not shown in figures, an opening portion (not shown) is formed through the inter-insulating layer 105 to expose a contact area of the thin film transistor. The opening portion may be formed in the reflection area RA. A drain electrode of the thin film transistor may be connected to the pixel electrode through the opening portion.

A conductive layer (not shown) may be formed on the inter-insulating layer 105. The conductive layer may include a metal material, such as aluminum, to reflect the light. The conductive layer may be patterned to form the reflection electrode RE in the reflection area RA. The shape of the reflection electrode RE is the same as that shown in FIG. 1, 3, or 4.

Figure 18:
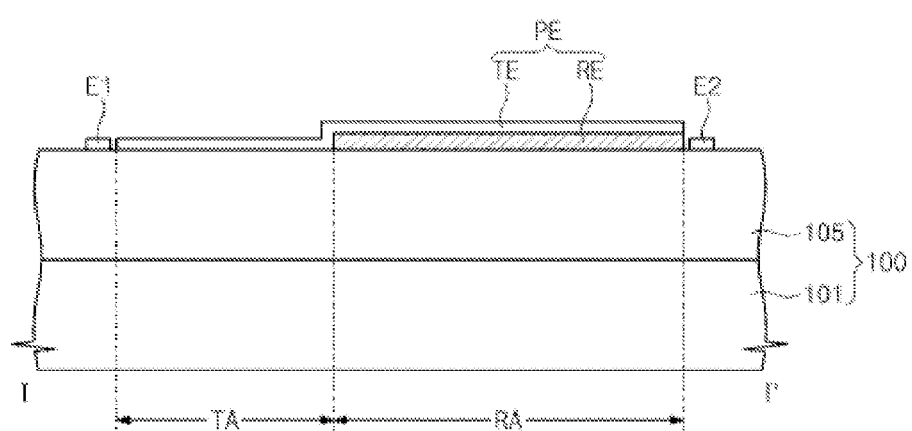

Referring to FIG. 18, a transparent conductive layer (not shown), e.g., indium tin oxide, may be formed on the resultant structure of FIG. 17. The transparent conductive layer may be patterned to form the transmission electrode TE, the first electrode E1, and the second electrode E2. The transmission electrode TE and the reflection electrode RE form the pixel electrode PE. The transmission electrode TE is formed over the reflection area RA and the transmission area TA. In this case, the shape of the pixel electrode PE, the first electrode E1, and the second electrode E2 and the position relation between the pixel electrode PE, the first electrode E1, and the second electrode E2 may be the same as those of FIG. 1, 3, or 4.

Figure 19:
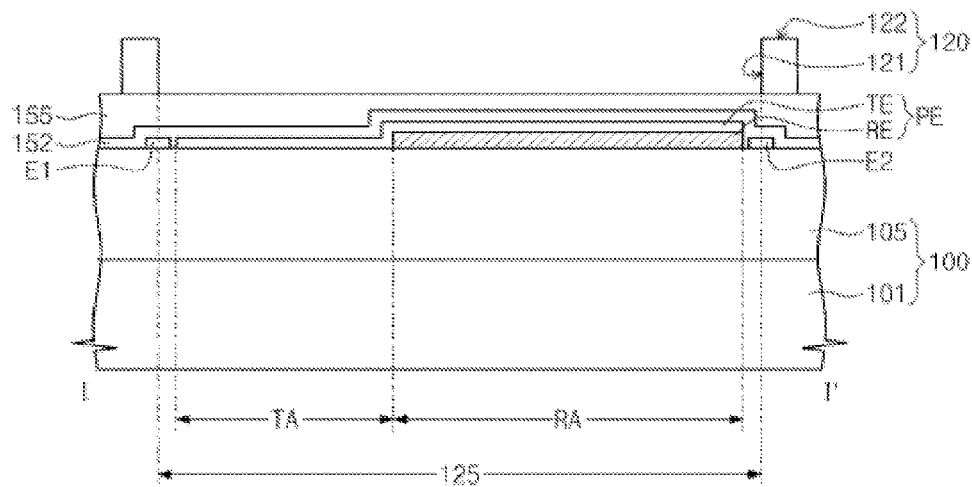
Figure 20:
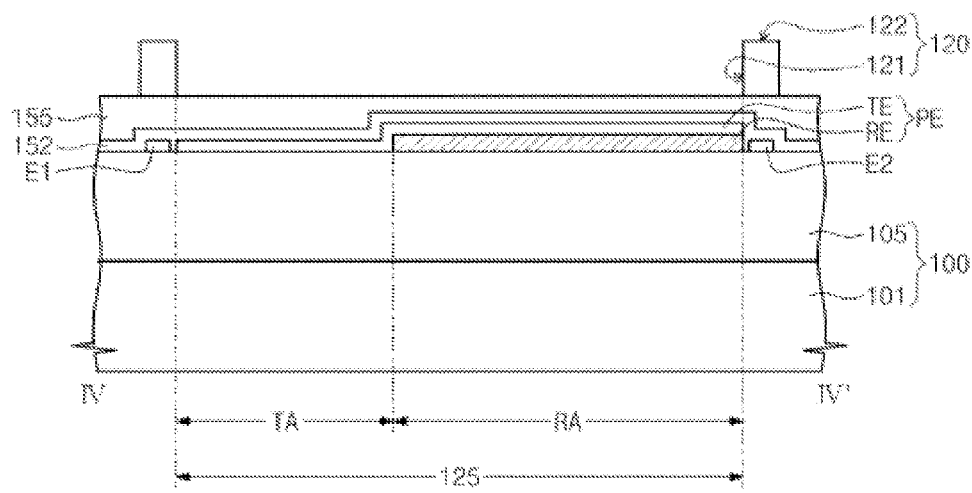

Referring to FIG. 19, the barrier layer 152 is formed on the first substrate 100 to cover the first electrode E1, the second electrode E2, and the pixel electrode PE. The barrier layer 152 may protect structures disposed thereunder. For example, the barrier layer 152 may protect lower structures from environmental conditions such as humidity. The barrier layer 152 may include oxide such as silicon oxide.

The insulating layer 155 may be formed on the barrier layer 152. The insulating layer 155 may include a hydrophobic material such as Teflon.

The pixel wall 120 may be formed on the insulating layer 155 to define the unit pixel area 125. For example, an organic material is coated on the insulating layer 155 to form an organic layer (not shown). In order to coat the organic layer, the insulating layer 155 may be hydrophilically treated temporarily. The organic layer may include a light-curing material and may be partially cured by selectively irradiating light onto the organic layer. Portions of the organic layer, onto which the light is not irradiated, may be removed to form the pixel wall 120. The portion of the insulating layer 155, which corresponds to the pixel electrode PE, may be exposed by the pixel wall 120. In addition, the pixel wall 120 may be overlapped with the portion of the first electrode E1 and the second electrode E2. Further, the pixel wall 120 may be partially overlapped with the body portions 241a and 246a (shown in FIG. 3) of the first electrode E1 and the second electrode E2. The pixel wall 120 includes the side surface 121 and the upper surface 122. The side surface 121 faces the unit pixel area 125 and the upper surface 122 faces the same direction as the insulating layer 155.

Referring to FIG. 20, the pixel wall 120 may be formed to cover the body portions 341a and 346a (shown in FIG. 4) of the first electrode E1 and the second electrode E2. That is, the body portions 341a and 346a may be positioned entirely in the area corresponding to the pixel wall 120.

The upper surface 122 of the pixel wall 120 may be hydrophilically treated, and thus the upper surface 122 of the pixel wall 120 may have the hydrophilic property.

Figure 21:

Referring to FIG. 21, the second substrate 190 is prepared. The second substrate 190 includes the second base substrate 191 and the common electrode 192 disposed on the second base substrate 191. The second base substrate 191 may be transparent or/and flexible, such as a glass substrate, a plastic substrate, etc. The common electrode 192 may be the transparent electrode.

The black matrix 180 may be formed on the common electrode 192. The black matrix 180 may be formed by coating an organic opaque material on the second substrate 190 and patterning the organic opaque material.

Figure 22:
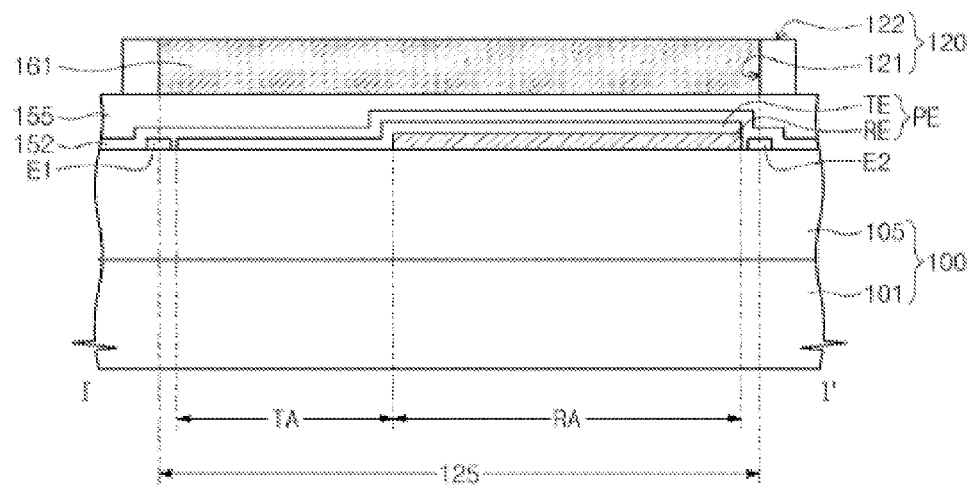

Referring to FIG. 22, the unit pixel area 125 surrounded by the pixel wall 120 may be filled with the non-polar fluid 161. The non-polar fluid 161 may be provided to cover at least the exposed insulating layer 155 in the unit pixel area 125. Accordingly, the non-polar fluid 161 makes contact with a portion of the side surface 121 or the entirety of the side surface 121. That is, the non-polar fluid 161 partially or completely fills the area surrounded by the pixel wall 120.

For example, the non-polar fluid 161 may be provided to the unit pixel area 125 by using a printing method or dipping the resultant structure of FIG. 19 into a solution including the polar fluid and the non-polar fluid. The resultant structure of FIG. 21 and the resultant structure of FIG. 22 may be coupled to each other in the solution, and the polar fluid may be provided between the resultant structure of FIG. 21 and the resultant structure of FIG. 22.

Although not shown in figures, a sealant may be provided between the first substrate 100 and the second substrate 190 to couple the first substrate 100 with the second substrate 190.

According to the above, a unit pixel includes electrodes facing each other with a pixel electrode interposed therebetween, so that the unit pixel may be driven in two different modes. That is, a voltage may be selectively applied to one of the electrodes to control a movement direction of a non-polar fluid, thereby realizing the two different modes in one unit pixel. In addition, since the non-polar fluid is separated from the pixel wall before the unit pixel is driven in a transmissive mode or a reflective mode, a driving voltage may be reduced. Further, a hysteresis occurring when the unit pixel is driven may be reduced or prevented.

Although exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A display apparatus comprising:
   a substrate comprising a transmission area and a reflection area;
   a fluid layer disposed on the substrate, wherein the fluid layer comprises a first fluid and a second fluid, wherein the first fluid and the second fluid are substantially immiscible;
   a pixel electrode disposed on the transmission area and the reflection area, wherein the pixel electrode comprises a transmission electrode and a reflection electrode;
   a first electrode disposed in a first plane and on the substrate adjacent to the transmission area and spaced apart from the pixel electrode; and
   a second electrode disposed in the first plane and on the substrate adjacent to the reflection area and spaced apart from the pixel electrode, wherein at least a portion of the pixel electrode is substantially in the first plane and interposed between the first electrode and the second electrode,
   wherein application of a first preparation voltage to the first electrode controls the second fluid to push the first fluid toward the first electrode, and
   wherein application of a first driving voltage to the pixel electrode drives the display apparatus in a first mode.

2. The display apparatus of claim 1, wherein the first preparation voltage is larger than the first driving voltage.

3. The display apparatus of claim 1, wherein a level of the first driving voltage is such that the second fluid is controllable to push the first fluid to cover the reflection area.

4. The display apparatus of claim 1, wherein:
   upon ceasing application of the first preparation voltage and the first driving voltage, application of a second preparation voltage to the second electrode controls the second fluid to push the first fluid toward the second electrode; and
   application of a second driving voltage to the pixel electrode drives the display apparatus in a second mode.

5. The display apparatus of claim 4, wherein a level of the first preparation voltage and a level of the second preparation voltage are such that the first fluid is separated from a pixel wall.

6. The display apparatus of claim 4, wherein the second preparation voltage is larger than the second driving voltage.

7. The display apparatus of claim 1, wherein the transmission area is spaced apart from the second electrode and the reflection area is disposed between the transmission area and the second electrode.

8. The display apparatus of claim 1, further comprising a pixel wall that defines a unit pixel area on the substrate, wherein the first electrode and the second electrode are disposed between the pixel wall and the substrate, and the first electrode and the second electrode are partially overlapped with the pixel wall.

9. The display apparatus of claim 8, wherein the first electrode and the second electrode are substantially parallel to each other.

10. The display apparatus of claim 1, wherein the substrate is a first substrate and the display apparatus further comprises:
    a second substrate that faces the first substrate; and
    a black matrix disposed on a second substrate, wherein the black matrix is positioned over at least portions of the first electrode, the second electrode and the pixel electrode.

11. The display apparatus of claim 10, comprising a pixel wall that defines a unit pixel area on the substrate, wherein the black matrix is positioned over at least a portion of the pixel wall.

12. The display apparatus of claim 1, wherein the transmission area is adjacent to the reflection area and the reflection area is wider than the transmission area.

13. The display apparatus of claim 1, wherein the transmission electrode is disposed over the transmission area and the reflection area.

14. The display apparatus of claim 1, wherein the reflection electrode is disposed between the transmission electrode and the substrate.

15. The display apparatus of claim 1, wherein the first fluid comprises an oil-based material and the second fluid comprises an electrolyte solution.

16. A display apparatus comprising:
    a substrate comprising a transmission area and a reflection area;
    a first fluid and a second fluid disposed on the substrate, wherein the first fluid and the second fluid are substantially immiscible;
    a pixel electrode disposed on the transmission area and the reflection area, wherein the pixel electrode comprises a transmission electrode and a reflection electrode;

a first electrode disposed in a first plane and on the substrate adjacent to the transmission area and spaced apart from the pixel electrode;
a second electrode disposed in the first plane and on the substrate adjacent to the reflection area, wherein at least a portion of the pixel electrode is substantially in the first plane and interposed between the first electrode and the second electrode; and
a black matrix positioned over at least portions of the first electrode, the second electrode, and the pixel electrode,
wherein application of a first preparation voltage to the first electrode controls the second fluid to push the first fluid toward the first electrode, and
wherein application of a first driving voltage to the pixel electrode drives the display apparatus in a first mode.

17. The display apparatus of claim 16, wherein the transmission area is spaced apart from the second electrode and the reflection area is disposed between the transmission area and the second electrode.

18. The display apparatus of claim 16, wherein the first electrode and the second electrode are substantially parallel to each other.

19. The display apparatus of claim 16, wherein the transmission area is adjacent to the reflection area and the reflection area is wider than the transmission area.

20. The display apparatus of claim 16, wherein the transmission electrode is disposed over the transmission area and the reflection area, and wherein the reflection electrode is disposed between the transmission electrode and the substrate.

* * * * *